United States Patent
Yamashita et al.

(10) Patent No.: US 10,375,278 B2
(45) Date of Patent: Aug. 6, 2019

(54) NOISE CANCELLATION

(71) Applicant: Apple Inc., Cupertino, CA (US)

(72) Inventors: Keitaro Yamashita, San Jose, CA (US);
Ting-Kuo Chang, San Jose, CA (US);
Cheng-Ho Yu, Milpitas, CA (US);
Warren S. Rieutort-Louis, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 8 days.

(21) Appl. No.: 15/711,738

(22) Filed: Sep. 21, 2017

(65) Prior Publication Data

US 2018/0324331 A1 Nov. 8, 2018

Related U.S. Application Data

(60) Provisional application No. 62/501,571, filed on May 4, 2017.

(51) Int. Cl.
*G06F 3/041* (2006.01)
*H04N 5/213* (2006.01)
*H04N 5/357* (2011.01)
*G09G 3/20* (2006.01)

(52) U.S. Cl.
CPC ........... *H04N 5/213* (2013.01); *G09G 3/2092* (2013.01); *H04N 5/357* (2013.01); *G09G 2310/0267* (2013.01); *G09G 2320/0209* (2013.01); *G09G 2320/0219* (2013.01)

(58) Field of Classification Search
CPC .............. G06F 3/041; G06F 3/0418; G09G 2320/0209; G09G 2320/0219; G09G 2320/0247; H04N 5/213; H04N 5/357
See application file for complete search history.

(56) References Cited

U.S. PATENT DOCUMENTS

| | | | |
|---|---|---|---|
| 9,613,567 B2* | 4/2017 | Okuno | G09G 3/3233 |
| 2005/0237273 A1* | 10/2005 | Ozawa | G09G 3/3233 345/46 |
| 2007/0273619 A1* | 11/2007 | Kitazawa | G09G 3/3233 345/76 |
| 2010/0039411 A1* | 2/2010 | Yatabe | G09G 3/3233 345/204 |
| 2010/0188377 A1* | 7/2010 | Ota | G09G 3/3233 345/205 |
| 2010/0302228 A1* | 12/2010 | Ishiguro | G09G 3/3233 345/211 |
| 2010/0321422 A1* | 12/2010 | Ishiguro | G09G 3/3233 345/698 |
| 2012/0280969 A1* | 11/2012 | Hough | G09G 3/3433 345/212 |
| 2014/0104155 A1* | 4/2014 | Long | G09G 3/344 345/107 |
| 2016/0210899 A1* | 7/2016 | Hyun | G09G 3/3258 |
| 2017/0038898 A1* | 2/2017 | Kim | G09G 3/3225 |
| 2017/0103706 A1* | 4/2017 | Yang | G06F 3/0416 |
| 2017/0162121 A1* | 6/2017 | Yang | G06F 3/007 |

(Continued)

*Primary Examiner* — Joe H Cheng
(74) *Attorney, Agent, or Firm* — Fletcher Yoder P.C.

(57) ABSTRACT

Electronic devices, storage medium containing instructions, and methods pertain to cancelling noise that results from application of voltages on gates of transistors in a display. One or more compensation or dummy drivers are used to apply a compensation voltage that is an inversion of voltages applied on the gates of the transistors.

18 Claims, 9 Drawing Sheets

(56) References Cited

U.S. PATENT DOCUMENTS

2017/0178584 A1*  6/2017  Ma .................. G09G 3/3677
2017/0236885 A1*  8/2017  Koshihara .......... H01L 51/5265
                                                    257/89
2017/0372658 A1* 12/2017  Tamura ............. G09G 3/3275
2018/0277037 A1*  9/2018  Lin ................. G09G 3/3233

* cited by examiner

NOISE CANCELLATION

CROSS REFERENCE TO RELATED APPLICATIONS

This application claims the benefit of U.S. Provisional Application No. 62/501,571, filed on May 4, 2017, the contents of which are herein expressly incorporated by reference for all purposes.

BACKGROUND

The present disclosure relates generally to techniques to cancelling noise resultant from in a display. More specifically, the present disclosure relates generally to techniques for noise cancellation resulting from a gate driver clock and its interference with an overlay touch panel.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic display panels are used in a plethora of electronic devices. These display panels typically consist of multiple pixels that emit light. These pixels may be formed using self-emissive units (e.g., light emitting diode) or pixels that utilize units that are backlit (e.g., liquid crystal diode). These pixels are usually controlled using transistors (e.g., thin film transistors) that utilize a driving threshold voltage to determine at which level the pixels are to be driven. These displays may also include touch functionality that may be interfered with by operation of the display. Specifically, noise from a gate driver clock of the gates of the pixels may pull a voltage of a touch sensing layer up or down in the direction of the clock voltage fluctuation due to capacitive coupling with a substrate on which pixel circuitry is mounted. This voltage fluctuation may result in false positive touches and/or may result in touches occurring without being sensed by the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A gate driver clock may be used to cancel out the voltage fluctuations of the touch layer. As previously noted, these fluctuations may be caused by a gate driver clock driving pixels connected to a substrate. A gate driver clock may be driven at an inverse voltage simultaneously with any connected gate driver clock to reduce the effect of the fluctuation on the touch levels. Moreover, this gate driver clock may be a dummy gate driver clock that is merely connected to the substrate without passing a voltage to any gate for usage. Additionally, in some embodiments, each operating gate driver clock may be at least partially cancelled using a respective dedicated gate driver clock, but in other embodiments, a cancelling gate driver clock may at least partially cancel out one or more other gate driver clock fluctuations.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed, cancelling gate driver clock(s) may be used to cancel out the voltage fluctuations of a touch layer. As previously noted, these fluctuations on the touch layer may be caused by a gate driver clock driving pixels connected to a substrate. A gate driver clock may be driven at an inverse voltage simultaneously with any connected gate driver clock to reduce the effect of the fluctuation on the touch levels. Moreover, this gate driver clock may be a dummy gate driver clock that is merely connected to the substrate without pass a voltage to any gate for usage. Additionally, in some embodiments, each operating gate driver clock may be at least partially cancelled using a respective dedicated gate driver clock, but in other embodiments, a cancelling gate driver clock may at least partially cancel out one or more other gate driver clock fluctuations.

Figure 1:
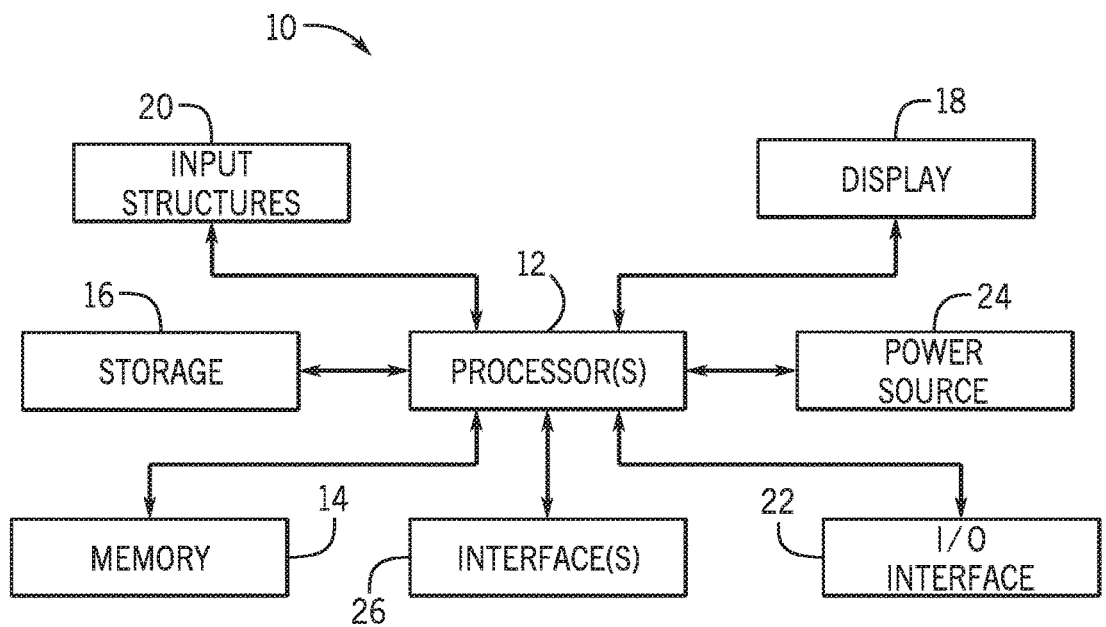
FIG. 1 is a schematic block diagram of an electronic device including a display, in accordance with an embodiment.

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level, a camera to record video or capture images). The I/O interface 22 may enable the electronic device 10 to interface with various other electronic devices. Additionally or alternatively, the I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include the power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a Bluetooth network, for a local area network (e.g., LAN) or wireless local area network (e.g., WLAN), such as an 802.11 Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth.

Figure 2:
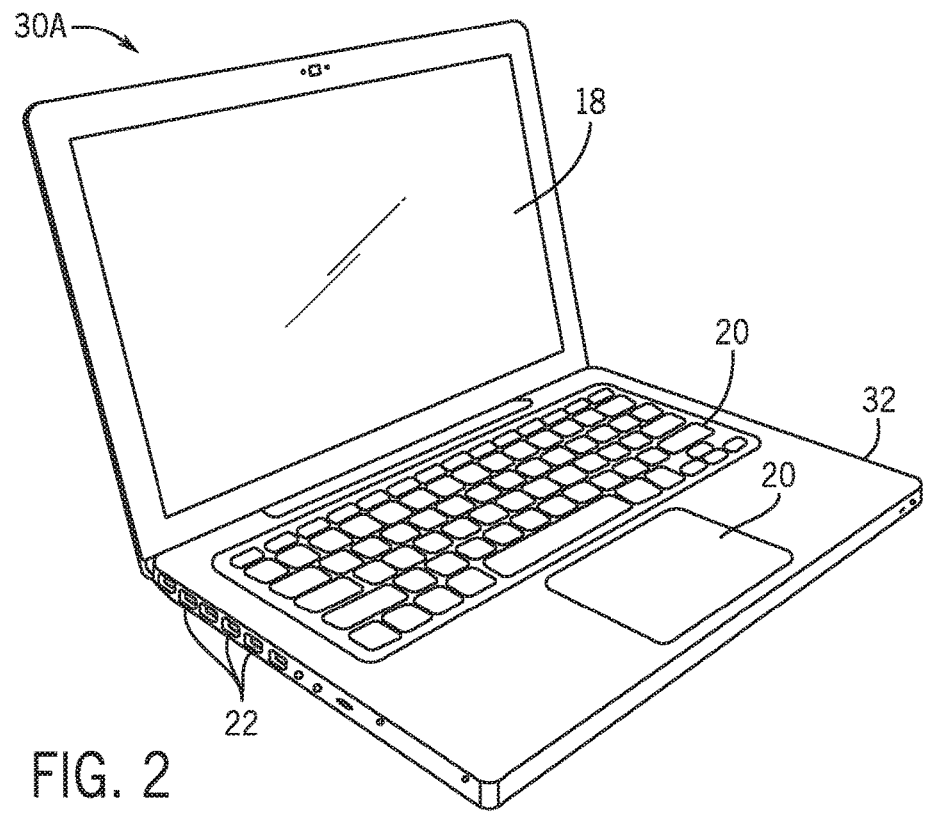
FIG. 2 is a perspective view of a notebook computer representing an embodiment of the electronic device of FIG. 1, in accordance with an embodiment.
Figure 4:
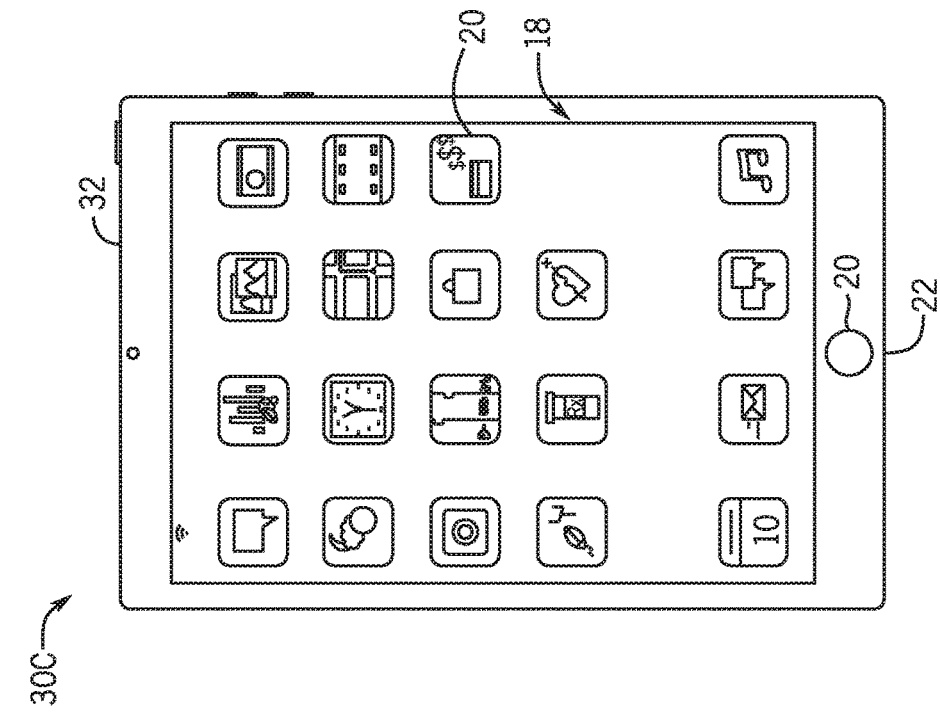
FIG. 4 is a front view of another hand-held device representing another embodiment of the electronic device of FIG. 1, in accordance with an embodiment.
Figure 3:
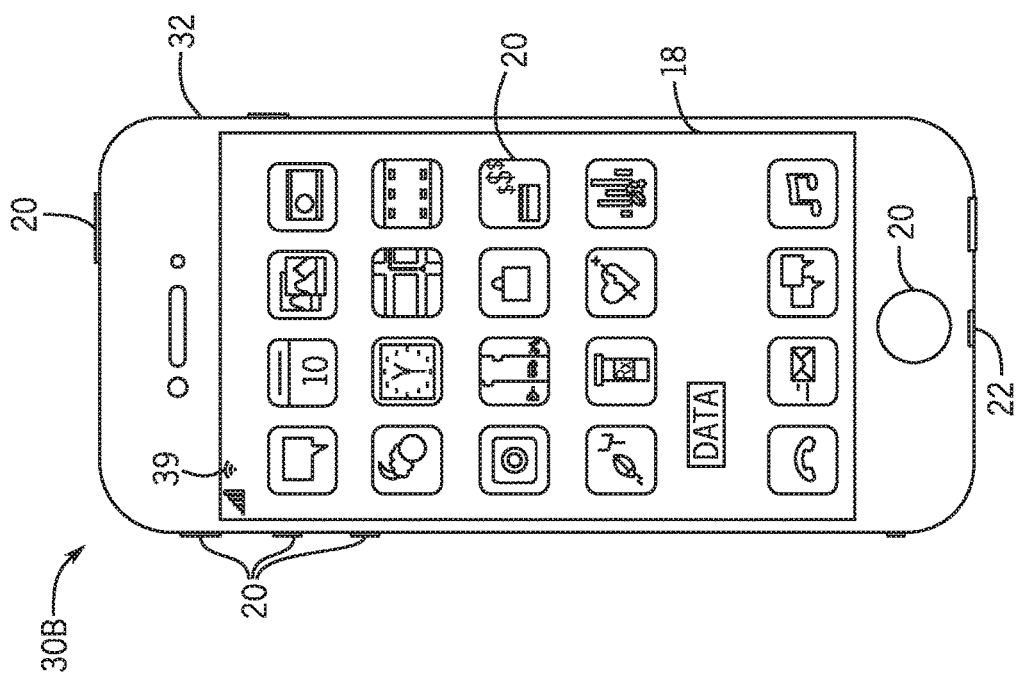
FIG. 3 is a front view of a hand-held device representing another embodiment of the electronic device of FIG. 1, in accordance with an embodiment.
Figure 5:
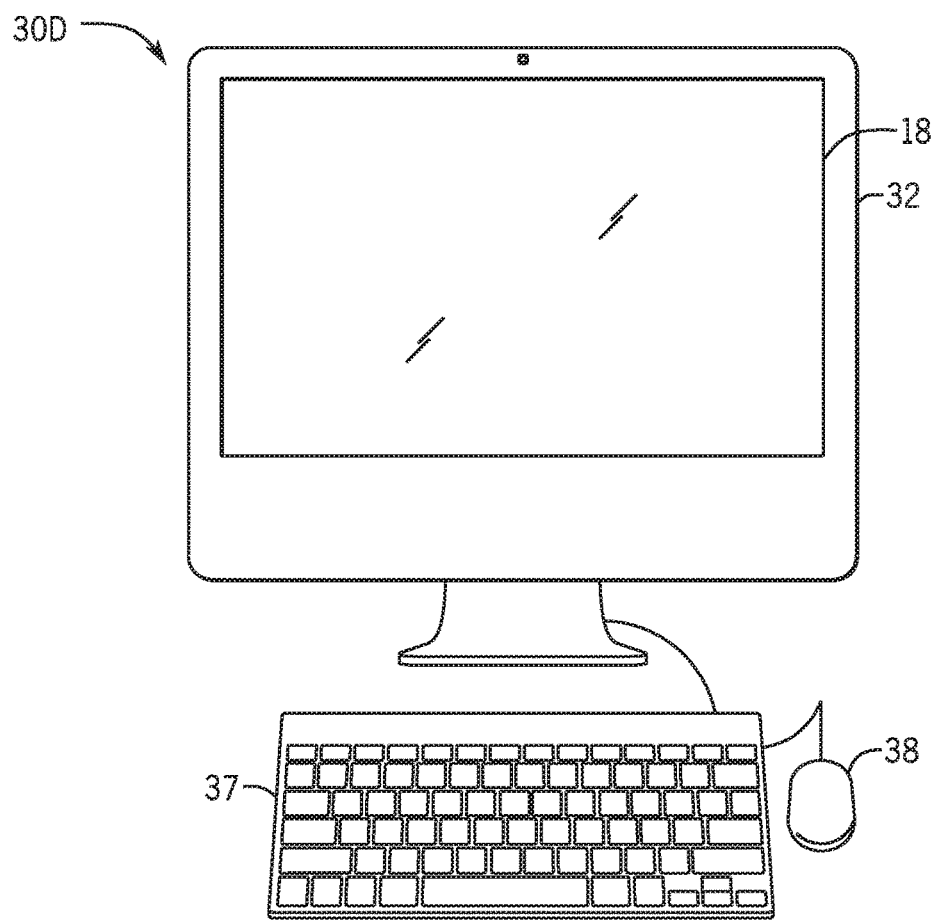
FIG. 5 is a front view of a desktop computer representing another embodiment of the electronic device of FIG. 1, in accordance with an embodiment.
Figure 6:
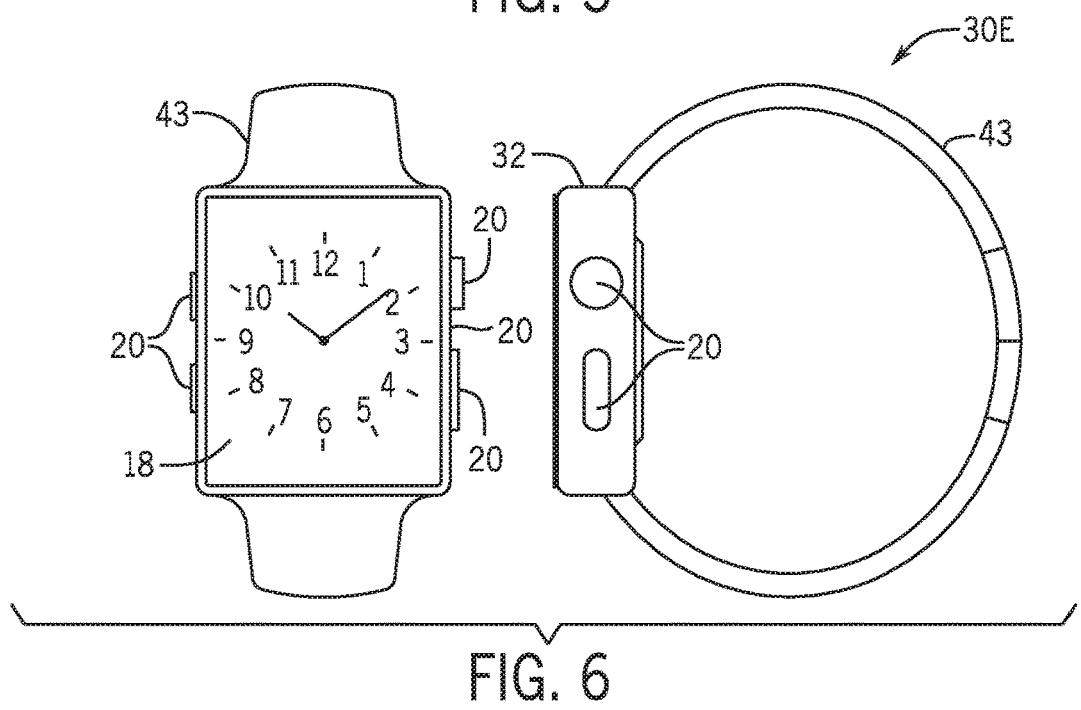
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 32 to protect interior components from physical damage and to shield them from electromagnetic interference. The enclosure 32 may surround the display 18, which may display indicator icons. The indicator icons may indicate, among other things, a cellular signal strength, Bluetooth connection, and/or battery life. The I/O interfaces 22 may open through the enclosure 32 and may include, for example, an I/O port for a hard-wired connection for charging and/or content manipulation using a connector and protocol, such as the Lightning connector provided by Apple Inc., a universal serial bus (e.g., USB), one or more conducted RF connectors, or other connectors and protocols.

The illustrated embodiments of the input structures 20, in combination with the display 18, may allow a user to control the handheld device 30B. For example, a first input structure 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone that may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the dual-layer display 18. In certain embodiments, a user of the computer 30D may interact with the computer 30D using various peripheral input devices, such as the keyboard 37 or mouse 38, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, an organic light emitting diode display, an active-matrix organic light emitting diode (e.g., AMOLED) display, and so forth), which may allow users to interact with a user interface of the wearable electronic device 30E.

Figure 7:
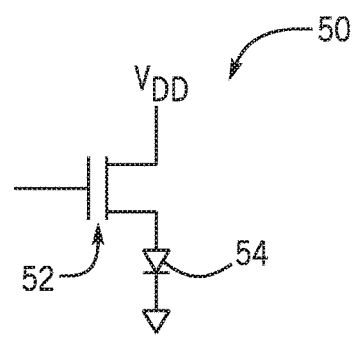
FIG. 7 is a schematic view of a unit pixel having a transistor and an illumination element, in accordance with an embodiment.

FIG. 7 illustrates a portion of unit pixel circuitry 50. The unit pixel circuitry 50 includes a control transistor 52 that controls emission levels of a light emitting diode (LED) 54. For example, the transistor 52 may include a thin film transistor (TFT). A gate of the transistor 52 may be driven using a gate driver clock. However, this gate driver clock may result in voltage fluctuations of a touch layer of the display.

Figure 8:
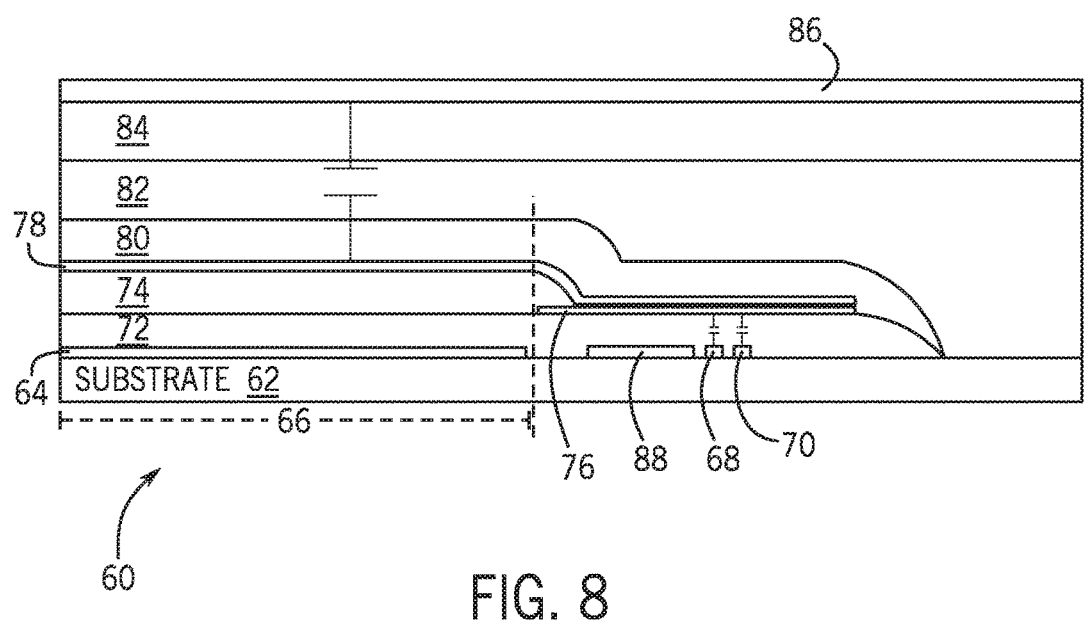
FIG. 8 is a cross-sectional view of a portion of the display of FIG. 1, in accordance with an embodiment.

FIG. 8 illustrates a cross-sectional view of a portion 60 of the display 18. The portion 60 includes a substrate 62 upon which pixel circuitry 64 is mounted within an active area 66 of the display 18. For example, the pixel circuitry 64 may include thin-film transistors (TFTs). The pixel circuitry 64 is driven using two single-phase gate driver clocks 68 and 70 to drive gates in the active area and/or outside the active area. The portion 60 also includes one or more planarization layers 72 and 74 that are made of insulative material, such as a nitride or an oxide. An anode electrode 76 and a cathode electrode 78 may be used to carry current in and out of the active area for display and/or touch functionality. The portion 60 may also include one or more insulative layers 80, 82, and 84 separating a touch layer/electrode 86 from the cathode 78. When the touch electrode 86 voltage fluctuates, a scan driver circuit detects such fluctuations and attributes touches exceeding a threshold to a touch of the display 18.

Figure 9:
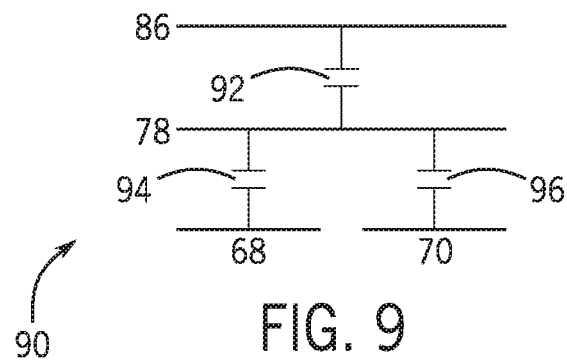
FIG. 9 is a cross-sectional view of a capacitive coupling of a touch layer with a gate driver clocks, in accordance with an embodiment.

However, the voltage of the touch electrode 86 may fluctuate without a touch of the display. Instead, the voltage may fluctuate due to voltage changes at the cathode 78 due to capacitive coupling between touch electrode 86 and the cathode 78 through the insulative layers 80, 82, and 84. Similarly, capacitive coupling may occur between the cathode 78 and the substrate 82 though the planarization layer 72. FIG. 9 illustrates a schematic view of these capacitive couplings. As illustrated, a capacitive coupling 92 may occur between the touch electrode 86 and the cathode 78. Similarly, capacitive coupling 94 may occur between the cathode 78 and the substrate 82 at the gate driver clock 68, and another capacitive coupling 96 may occur between the cathode 78 and the substrate 82 at the gate driver clock 70.

Figure 10:
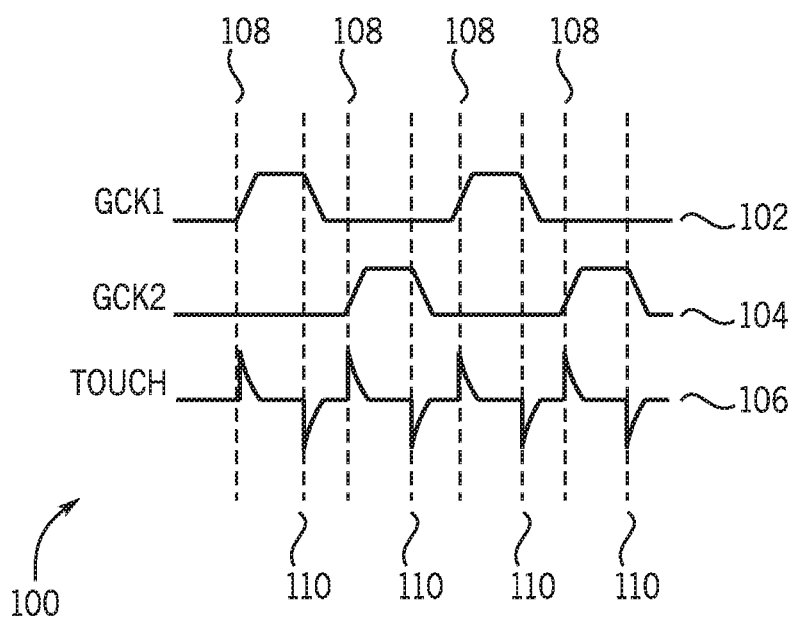
FIG. 10 is a timing diagram illustrating noise effect on the touch layer due to the gate driver clocks of FIG. 10, in accordance with an embodiment.

These couplings cause the voltage at the touch electrode 86 to vary when the gate driver clock 68 and/or the gate driver clock 70 fluctuate. FIG. 10 illustrates an embodiment of a timing diagram 100 illustrating this relationship. The timing diagram 100 illustrates a signal 102 indicative of the voltage at the gate driver clock 68 (GCK1) and a signal 104 indicative of the voltage at the gate driver clock 70 (GCK2). The timing diagram 100 also illustrates a signal 106 indicative of a touch electrode voltage. In the illustrated timing diagram 100, no actual touch has occurred. However, the signal 106 spikes upwardly with each rising edge 108 of GCK1 102 and GCK 2 104. If this spike exceeds a threshold for detecting a touch, this spike may register as a false positive. Moreover, the signal 106 also spikes downwardly with each falling edge 110 of the GCK1 102 and GCK2 104. If this downward spike occurs at the time of an actual touch, the touch may not register as a touch due to the downward spike pushing the signal 106 down below the threshold for touch sensing detection.

To address these voltage fluctuations, cancelling signals (e.g., from gate driver clocks) may be injected into the substrate at opposite polarity with similar amplitude and frequency to at least partially cancel the causes of the voltage fluctuations illustrated in FIG. 9.

Figure 11:
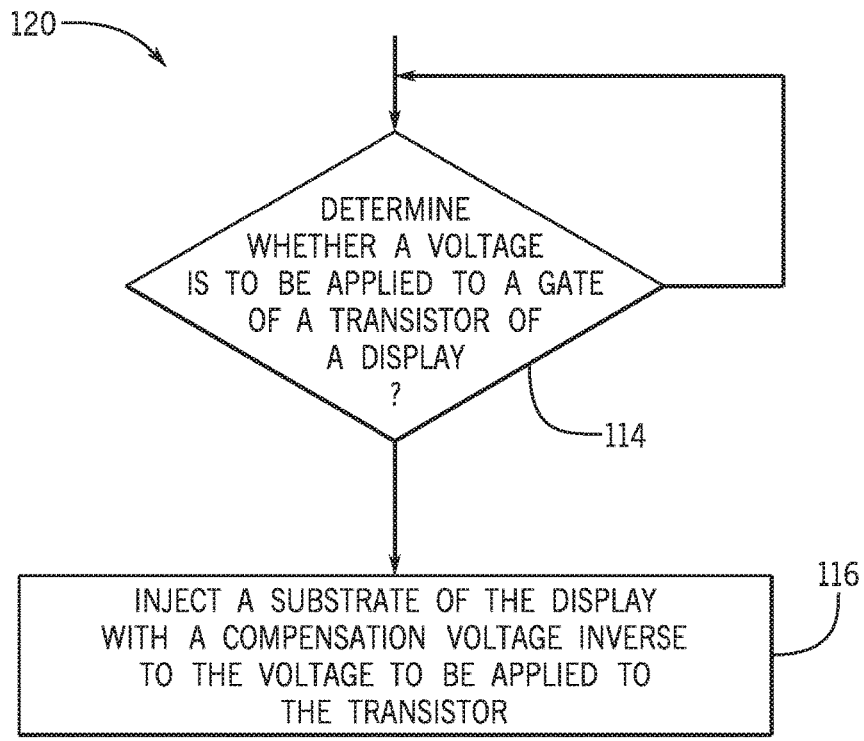
FIG. 11 is a flow diagram of a process for cancelling noise on a touch electrode of the display of FIG. 8, in accordance with an embodiment.

FIG. 11 illustrates a process for at least partially cancelling noise in a display with touch sensing. The processor 12 and/or timing circuitry in the display 18 determines that a voltage is to be applied to gates of transistors of the display (block 114). The processor 12 and/or the timing circuitry cause inverse signals to be generated and injected into the substrate to at least partially cancel voltage fluctuations that would be caused by the gate driver clock (block 116). These inverse signals may include signals that are not proactively used to control other circuitry. Instead, in such embodiments, these inverse signals may be a "dummy" or "compensation" gate driver clock that generates an inverted clock signal to cancel out such effects. Additionally or alternatively, these inverse clock signals may be used to switch other circuitry such as gates of adjacent pixels. These inverse signals may be used in a polarity switching timing scheme and/or to control gates in depletion mode.

Figure 12:
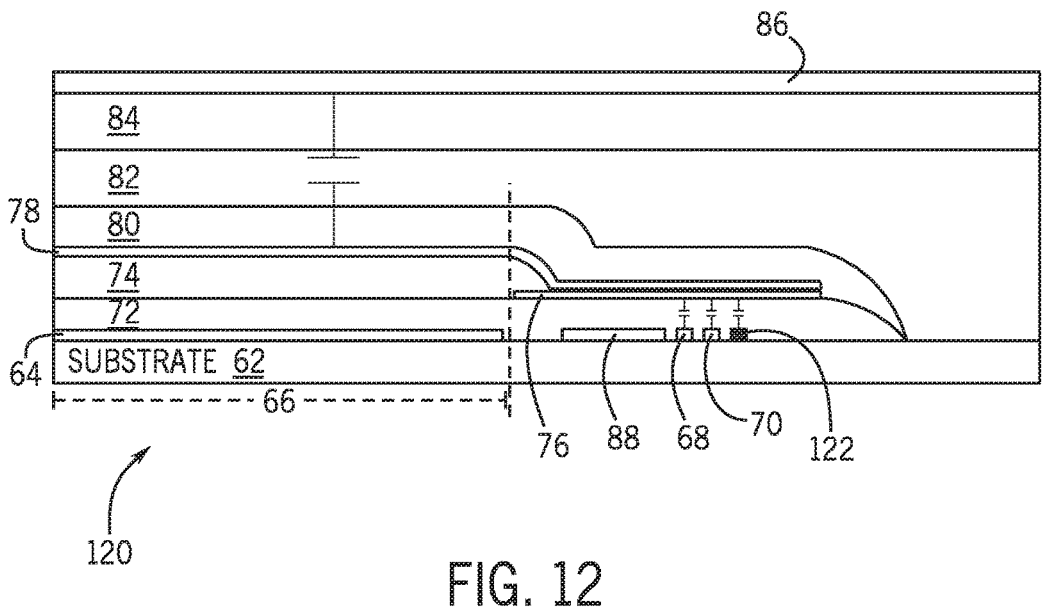
FIG. 12 is a cross-sectional view of a portion of the display of FIG. 1, in accordance with an embodiment.
Figure 13:
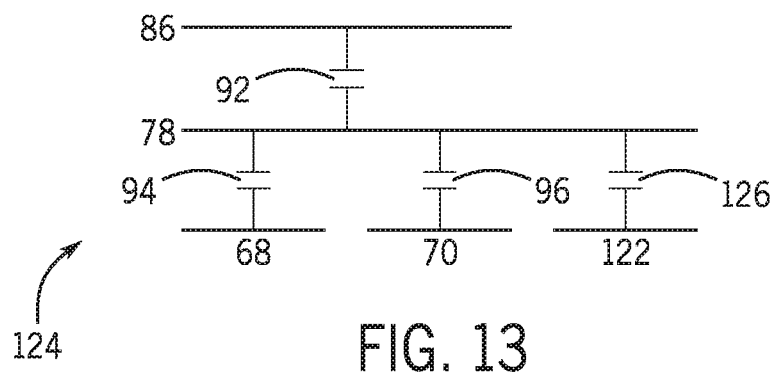
FIG. 13 is a cross-sectional view of a capacitive coupling of a touch layer with a gate driver clocks, in accordance with an embodiment.

FIG. 12 illustrates a portion 120 of the display 18 that is similar to the portion 60. However, the portion 120 includes a single cancelling signal generator—cancelling gate driver clock 122—that injects an inverse signal of what is being injected in to the substrate 82 by the gate driver clocks 68 and 70. FIG. 13 illustrates the capacitive coupling 124 of the touch electrode 86, the cathode 88, and the gate driver clocks 68, 70, and 122. Specifically, this coupling 124 is similar to the coupling 90 shown in FIG. 9 except that an additional coupling 126 exists in the coupling 124.

Figure 14:
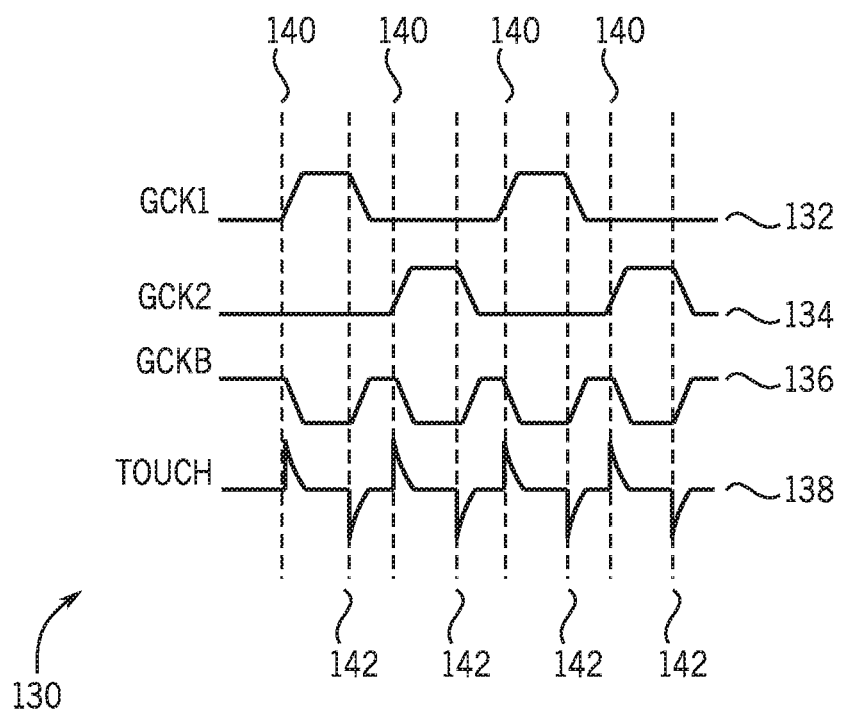
FIG. 14 is a timing diagram illustrating noise effect on the touch layer due to the gate driver clocks of FIG. 13, in accordance with an embodiment.

FIG. 14 illustrates an embodiment of a timing diagram 130 illustrating a relationship between the gate driver clocks and a touch electrode voltage utilizing voltage fluctuation compensation. The timing diagram 130 illustrates a signal 132 indicative of the voltage at the gate driver clock 68 (GCK1) and a signal 134 indicative of the voltage at the gate driver clock 70 (GCK2). The timing diagram 130 also illustrates a signal 136 indicative of the voltage at the dummy gate driver clock 122 (GCKB) and a signal 138 indicative of a touch electrode voltage. In some embodiments, the GCKB 122 signal may be generated by performing a logical AND on GCK1 signal 132 and GCK2 signal 134 and inverting (either before ANDing or after ANDing).

In the illustrated timing diagram 130, no actual touch has occurred, but the signal 138 increases upwardly with each rising edge 140 of the of GCK1 132 and GCK 2 134. However, this increase is relatively lower than the spike in the timing diagram 100 of FIG. 10 due to the inclusion of the voltage on the display via GCKB 138. Moreover, decreases in the signal 106 with each falling edge 142 of the GCK1 132 and GCK2 134 may also be relatively lower due to inverse application of voltages on the GCKB 138. In other words, the increase/decrease in voltage due to GCK1 132 and/or GCK2 134 switching may be partially or completely reduced. This reduced magnitude of fluctuation on the touch electrode may reduce the likelihood of a false positive of a touch event.

Figure 15:
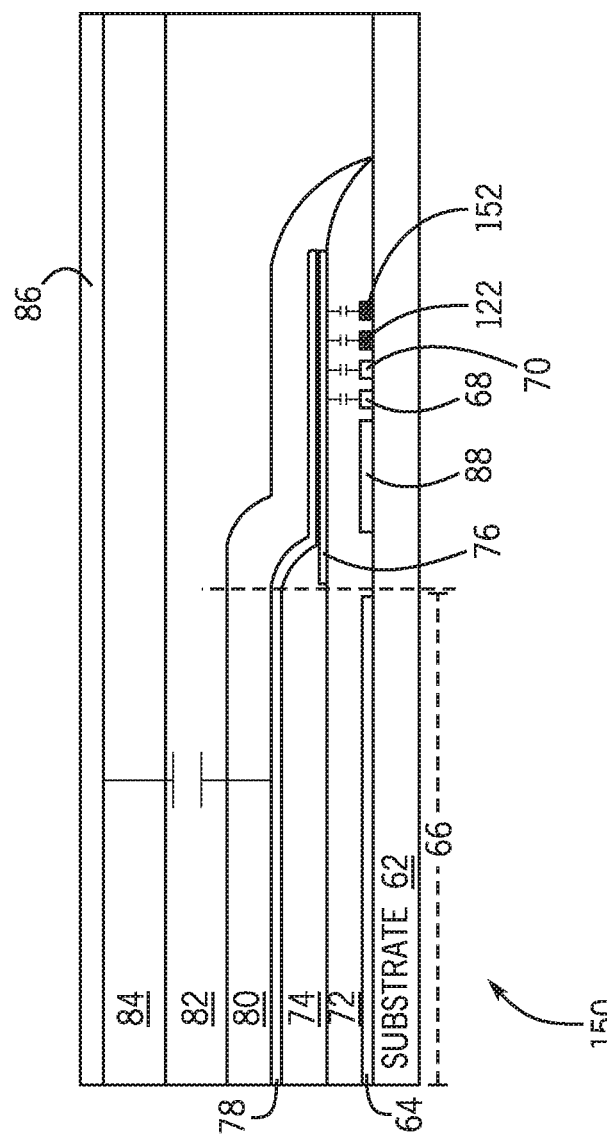
FIG. 15 is a cross-sectional view of a portion of the display of FIG. 1, in accordance with an embodiment.

FIG. 15 illustrates a portion 150 of the display 18 that is similar to the portion 130. However, the portion 120 includes an additional cancelling signal generator—gate clock driver 152—in addition to the cancelling signal generator—gate clock driver 122—that injects an inverse signal of what is being injected in to the substrate 82 by the gate driver clocks 68 and 70. In the illustrated embodiment, a noise cancelling signal generator may be used for individual gate clocks. In other words, the cancelling signal generator may at least partially cancel noise arising from operation of the gate driver clock 68 while the additional cancelling signal generator at least partially cancels noise arising from operation of the gate driver clock 70. The timing of each cancelling gate drivers 122 and 152 may be a simple inversion of a corresponding gate driver clock. However, inclusion of additional gate drivers (e.g., cancelling signal generator) may increase a size of compensation circuitry in the display causing the display size to potentially increase without increasing viewable space and/or increasing complication of routing in the display. Some embodiments may use a combination of dedicated signal cancellation and individual cancellation by using more than a single noise cancellation driver, but using at least one of those noise cancellation circuitries to at least partially cancel noise arising from more than one single gate driver clock.

Figure 16:
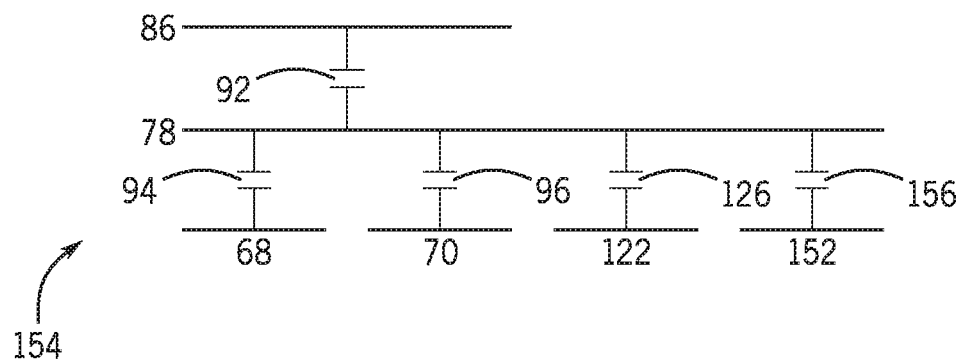
FIG. 16 is a cross-sectional view of a capacitive coupling of a touch layer with a gate driver clocks, in accordance with an embodiment.

FIG. 16 illustrates the capacitive coupling 154 of the touch electrode 86, the cathode 88, and the gate driver clocks 68, 70, 122, and 152. Specifically, this coupling 154 is similar to the coupling 124 shown in FIG. 13 except that an additional coupling 156 exists in the coupling 154 due to the additional gate driver clock 152.

Figure 17:
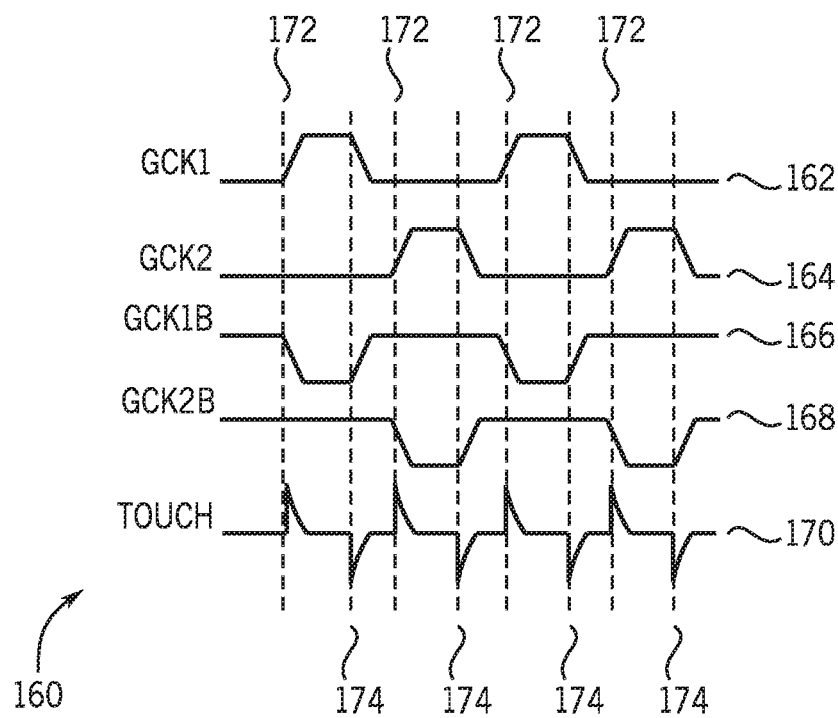
FIG. 17 is a timing diagram illustrating noise effect on the touch layer due to the gate driver clocks of FIG. 16, in accordance with an embodiment.

FIG. 17 illustrates a timing diagram 160 that is similar to the timing diagram 130 of FIG. 14. However, as noted, FIG. 17 utilizes two dummy gate driver clocks to compensate for noise generated by other gate driver clocks. The timing diagram 160 illustrates a relationship between the gate driver clocks and a touch electrode voltage utilizing voltage fluctuation compensation. The timing diagram 160 illustrates a signal 162 indicative of the voltage at the gate driver clock 68 (GCK1) and a signal 164 indicative of the voltage at the gate driver clock 70 (GCK2). The timing diagram 130 also illustrates a signal 166 indicative of the voltage at the dummy gate driver clock 122 (GCK1B), a signal 168 indicative of the voltage at the dummy gate driver clock 152 (GCK2B), and a signal 170 indicative of a touch electrode voltage. In the illustrated timing diagram 160, no actual touch has occurred, but the signal 170 increases upwardly with each rising edge 172 of the of GCK1 162 and GCK 2 164. However, this increase is relatively lower than the spike in the timing diagram 100 of FIG. 10 due to the inclusion of the dummy gate driver clocks 122 and 152 applying voltages GCK1B 166 and GCK2B 168. Moreover, decreases in the signal 170 with each falling edge 174 of the GCK1 162 and GCK2 264 are also relatively lower due to inverse application of voltages on the GCK1B 166 and GCK2B 168. This reduced magnitude of fluctuation on the touch electrode may reduce the likelihood of a false positive of a touch event. In some embodiments, the fluctuations may be reduced entirely.

It is worth noting that using a dedicated compensating dummy gate driver clock for each gate driver clock may simplify driving of the dummy gate driver clocks and/or assure that all gate driver clocks can be compensated for. However, using dedicated dummy gate driver clocks to compensate for each gate driver clock may use more space and/or complicate routing on the display. Thus, these two embodiments may be balanced based on design needs. Furthermore, these embodiments may be combined to include some dummy gate driver clocks driving compensating for two or more gate driver clocks while one or more dummy gate driver clocks compensate for one specific gate driver clock.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for driving a display comprising:
   determining whether a voltage is to be applied to a gate of a transistor of the display; and
   injecting, into a substrate of the display, a compensation voltage inverse to the voltage to be applied to the transistor, wherein injecting the compensation voltage comprises injecting the compensation voltage using a compensation gate driver clock that is connected to the substrate, and wherein the compensation gate driver clock compromises a dummy gate driver clock that is not used to drive any gate of any transistor.

2. The method of claim 1, comprising:
   determining whether an additional voltage is to be applied to a gate of an additional transistor of the display; and
   injecting, into the substrate of the display, an additional compensation voltage inverse to the additional voltage to be applied to the additional transistor using the compensation gate driver clock.

3. The method of claim 1, comprising:
   ANDing the voltage with the additional voltage to determine a combined voltage of the voltage and the additional voltage; and
   inverting the combined voltage.

4. The method of claim 1, comprising:
   determining whether an additional voltage is to be applied to a gate of an additional transistor of the display; and
   injecting, into the substrate of the display, an additional compensation voltage inverse to the additional voltage to be applied to the additional transistor using an additional compensation gate driver clock.

5. The method of claim 1, comprising detecting a touch on the display at a touch electrode of the display.

6. The method of claim 5, wherein detecting the touch comprises receiving a compensated signal on the touch electrode that has reduced noise on the touch electrode reduced due to application of the compensation voltage.

7. An electronic display comprising:
   a substrate;
   a touch electrode configured to detect touch on the electronic display;
   pixel circuitry coupled to the substrate;
   a gate driver clock coupled to the substrate, wherein the gate driver clock is configured to drive gates in the pixel circuitry; and
   a compensation gate driver clock configured to apply to the substrate a compensation voltage inverse to a voltage applied by the gate driver clock to at least partially compensate for voltage fluctuations in the touch electrode resulting from application of the voltage without driving any of the gates in the pixel circuitry.

8. The electronic display of claim 7, comprising an additional gate driver clock coupled to the substrate, wherein the additional gate driver clock is configured to drive additional gates in the pixel circuitry.

9. The electronic display of claim 8, wherein the compensation gate driver clock is configured to compensate both the voltage applied by the gate driver clock and an additional voltage applied to the additional gates by the additional gate driver clock.

10. The electronic display of claim 9, wherein an output of the compensation gate driver clock comprises:
    a logical AND of an output of the gate driver clock and an output of the additional gate driver clock; and
    an inversion of the logical ANDing of the output of the gate driver clock and the additional gate driver clock.

11. The electronic display of claim 8 comprising an additional compensation gate driver clock to apply an additional compensation voltage inverse to an additional voltage applied by the additional gate driver clock to at least partially compensate for voltage fluctuations in the touch electrode resulting from application of the additional voltage.

12. The electronic display of claim 7, wherein the gates are located in an active area of the electronic display.

13. An electronic display, comprising:
    a touch electrode configured to detect touch on the electronic display;
    a first gate driver clock configured to drive a first gate in the electronic display;
    a second gate driver clock configured to drive a second gate in the electronic display;
    a first compensation driver clock to apply a first compensation voltage inverse to a first voltage applied by the first gate driver clock to at least partially compensate for voltage fluctuations in the touch electrode resulting from application of the first voltage; and
    a second compensation driver clock to apply a second compensation voltage inverse to a second voltage applied by the second gate driver clock to at least partially compensate for voltage fluctuations in the touch electrode resulting from application of the second voltage.

14. The electronic display of claim 13, comprising a third gate driver clock configured to drive a third gate in the electronic display.

15. The electronic display of claim 14, wherein the first compensation driver clock is configured to at least partially compensate voltage fluctuations in the touch electrode due to application of a third voltage applied by the third gate driver clock, wherein the first gate driver clock and the third gate driver clock do not apply a voltage simultaneously.

16. The electronic display of claim 14, comprising a third compensation driver clock to apply a third compensation voltage inverse to a third voltage applied by the third gate driver clock to at least partially compensate for voltage fluctuations in the touch electrode resulting from application of the third voltage.

17. The electronic display of claim 13, wherein the first and second gates are in an active area of the electronic display.

18. The electronic display of claim 17, wherein the first and second gates comprise thin film transistors.

* * * * *